(12) United States Patent
Glaza

(10) Patent No.: US 7,266,450 B2
(45) Date of Patent: Sep. 4, 2007

(54) METHOD AND SYSTEM FOR SELECTING ROUTE GUIDANCE DATA FOR OFF-BOARD NAVIGATION

(75) Inventor: Mark J. Glaza, Warren, MI (US)

(73) Assignee: General Motors Corporation, Detroit, MI (US)

( * ) Notice: Subject to any disclaimer, the term of this patent is extended or adjusted under 35 U.S.C. 154(b) by 289 days.

(21) Appl. No.: 11/136,161

(22) Filed: May 23, 2005

(65) Prior Publication Data

US 2006/0265125 A1 Nov. 23, 2006

(51) Int. Cl.
*G01C 21/20* (2006.01)

(52) U.S. Cl. .................. 701/210; 701/208; 701/209; 701/200; 701/201; 340/995.12; 340/995.21

(58) Field of Classification Search ............... 701/200, 701/201, 209, 210; 340/995.12, 995.21
See application file for complete search history.

(56) References Cited

U.S. PATENT DOCUMENTS

| | | | |
|---|---|---|---|
| 4,812,843 A | 3/1989 | Champion, III et al. | |
| 5,508,931 A * | 4/1996 | Snider | 701/207 |
| 5,928,307 A * | 7/1999 | Oshizawa et al. | 701/210 |
| 6,026,346 A * | 2/2000 | Ohashi et al. | 701/210 |
| 6,252,544 B1 | 6/2001 | Hoffberg | |
| 6,278,939 B1 * | 8/2001 | Robare et al. | 701/208 |
| 6,278,942 B1 * | 8/2001 | McDonough | 701/210 |
| 6,427,119 B1 * | 7/2002 | Stefan et al. | 701/209 |
| 6,453,235 B1 * | 9/2002 | Endo et al. | 701/211 |
| 6,507,785 B1 * | 1/2003 | Stefan et al. | 701/210 |
| 6,542,818 B1 | 4/2003 | Oesterling | |
| 6,643,587 B2 | 11/2003 | Brodie | |
| 6,662,141 B2 * | 12/2003 | Kaub | 702/181 |
| 6,701,251 B2 * | 3/2004 | Stefan et al. | 701/211 |
| 6,718,262 B2 * | 4/2004 | Matsuda et al. | 701/211 |
| 6,925,378 B2 * | 8/2005 | Tzamaloukas | 701/200 |
| 7,072,765 B2 * | 7/2006 | Schmidt et al. | 701/209 |
| 2003/0236818 A1 | 12/2003 | Bruner et al. | |
| 2004/0066330 A1 * | 4/2004 | Knockeart et al. | 342/357.07 |
| 2004/0098192 A1 * | 5/2004 | Matsuda et al. | 701/200 |
| 2004/0142678 A1 | 7/2004 | Krasner | |
| 2005/0215200 A1 | 9/2005 | Oesterling | |
| 2005/0256639 A1 * | 11/2005 | Aleksic et al. | 701/210 |
| 2005/0261824 A1 * | 11/2005 | Furukawa | 701/201 |
| 2005/0261829 A1 * | 11/2005 | Furukawa | 701/210 |
| 2005/0261830 A1 * | 11/2005 | Furukawa | 701/211 |

OTHER PUBLICATIONS

U.S. Appl. No. 10/983,772, filed Nov. 8, 2004, John P. Weiss, et al.
U.S. Appl. No. 11/145,662, filed Jun. 6, 2005, John P. Weiss, et al.
U.S. Appl. No. 11/063,481, filed Feb. 23, 2005, Mark J. Glaza.

(Continued)

*Primary Examiner*—Thomas Black
*Assistant Examiner*—Wae Lenny Louie

(57) ABSTRACT

A method of navigating a vehicle includes determining a route. At least one probable off-route condition is determined based on the route. Digital map information is transmitted based on the determination of the at least one probable off-route condition from a call center to a vehicle telematics unit via a wireless connection.

20 Claims, 5 Drawing Sheets

OTHER PUBLICATIONS

U.S. Appl. No. 11/014,498, filed Dec. 16, 2004, Fraser, et al.
U.S. Appl. No. 11/138,985, filed May 26, 2005, Fraser, et al.
U.S. Appl. No. 10/909,500, filed Aug. 2, 2004, Hitan S. Kamdar, et al.
U.S. Appl. No. 11/194,308, Reeser.
U.S. Appl. No. 11/191,584, Kamdar.
U.S. Appl. No. 11/138,985, Glaza.
U.S. Appl. No. 11/063,481, Glaza.
U.S. Appl. No. 10/983,773, Glaza.
U.S. Appl. No. 11/145,662, Glaza.
U.S. Appl. No. 11/014,498, Frazer.

* cited by examiner

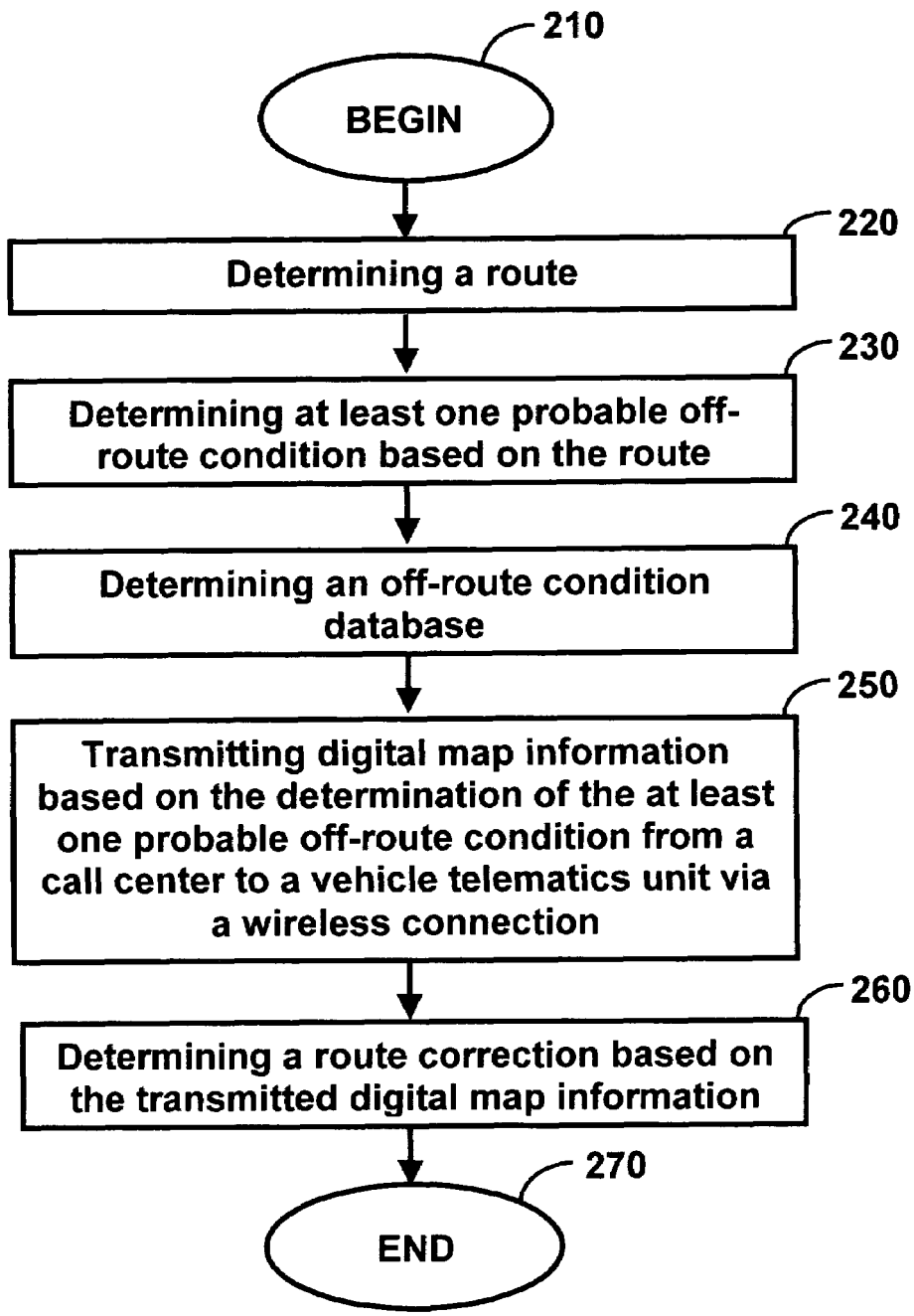

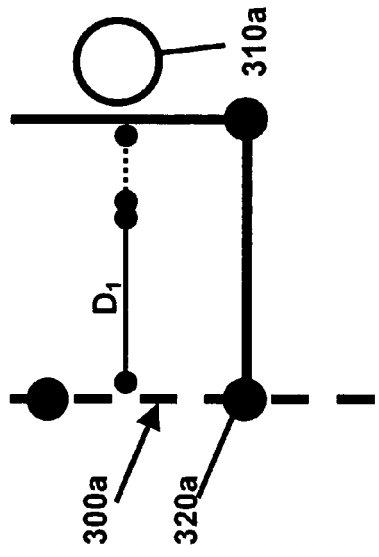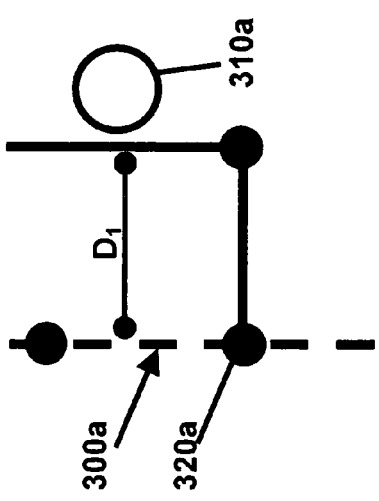
FIG. 3B
FIG. 4B
FIG. 3A
FIG. 4A

METHOD AND SYSTEM FOR SELECTING ROUTE GUIDANCE DATA FOR OFF-BOARD NAVIGATION

FIELD OF THE INVENTION

This invention relates generally to data transmissions over a wireless communication system. More specifically, the invention relates to a strategy for selecting route guidance data for off-board navigation.

BACKGROUND OF THE INVENTION

Many passenger vehicles now incorporate an integrated communication system, such as a Mobile Vehicle Communication Units (MVCU), providing a variety of fee-based subscription services in a mobile environment including navigational assistance. The MVCU is typically a vehicle telematics device including a cellular radio, satellite transceiver, and/or global positioning capabilities. Typically, a radio communication link is established between the MVCU and a call center through a wireless network.

Off board navigation is a means of providing turn-by-turn directions with a navigation device that obtains a route from a remote source (i.e., transmitted to the MVCU from the call center via the wireless network). Routes are generated then transmitted as route guidance data to a navigation device. One form of route guidance data transmitted to a navigation device for off-board navigation is data derived from a digital map database limited to data representing only the route being traversed. No additional digital map database data representing the road network around the route is transmitted. This form of route guidance data requires a minimum amount of data to be transmitted, thus reducing data transmission time and cost. However, using this form of route guidance data, correcting off-route conditions requires that a new route be transmitted, since additional digital map database data is not resident in the navigation device to generate a new route. Off-route conditions are determined by monitoring when the vehicle is positioned beyond a threshold distance away from the transmitted route, as opposed to determining that the vehicle is traveling on a road that is not part of the route.

To avoid having to transmit a new route to correct off route conditions, digital map database data representing the road network around the route can be transmitted along with the route to enable the navigation device to recalculate either a new route or a route back to the original route. Typically, the digital map database transmitted along with the route is limited to a fixed distance corridor around the route. Transmitting the corridor of digital map database data around the route increases data transmission time and cost. It would be desirable to provide a strategy for minimizing the amount of data transmitted and to avoid having to transmit a new route to correct an off road condition.

It is an object of this invention, therefore, to provide a strategy for selecting route guidance data for off-board navigation, and to overcome the deficiencies and obstacles described above.

SUMMARY OF THE INVENTION

One aspect of the invention provides a method of navigating a vehicle. The method includes determining a route. At least one probable off-route condition is determined based on the route. Digital map information is transmitted based on the determination of the at least one probable off-route condition from a call center to a vehicle telematics unit via a wireless connection.

Another aspect of the invention provides a computer usable medium including a program for navigating a vehicle. The medium includes computer readable program code for determining a route, and computer readable program code for determining at least one probable off-route condition based on the route. The medium further includes computer readable program code for transmitting digital map information based on the determination of the at least one probable off-route condition from a call center to a vehicle telematics unit via a wireless connection.

Another aspect of the invention provides a system for navigating a vehicle. The system includes means for determining a route and means for determining at least one probable off-route condition based on the route. The system further includes means for transmitting digital map information based on the determination of the at least one probable off-route condition from a call center to a vehicle telematics unit via a wireless connection.

The aforementioned, and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

BRIEF DESCRIPTION OF THE DRAWINGS

FIG. 2 illustrates a flowchart of navigating a vehicle, in accordance with one embodiment of the present invention;

FIGS. 3A and 3B illustrate a point-of-interest rule, in accordance with one embodiment of the present invention;

FIGS. 4A and 4B illustrate an intersection number rule, in accordance with one embodiment of the present invention;

DETAILED DESCRIPTION OF THE PRESENTLY PREFERRED EMBODIMENTS

Figure 1:
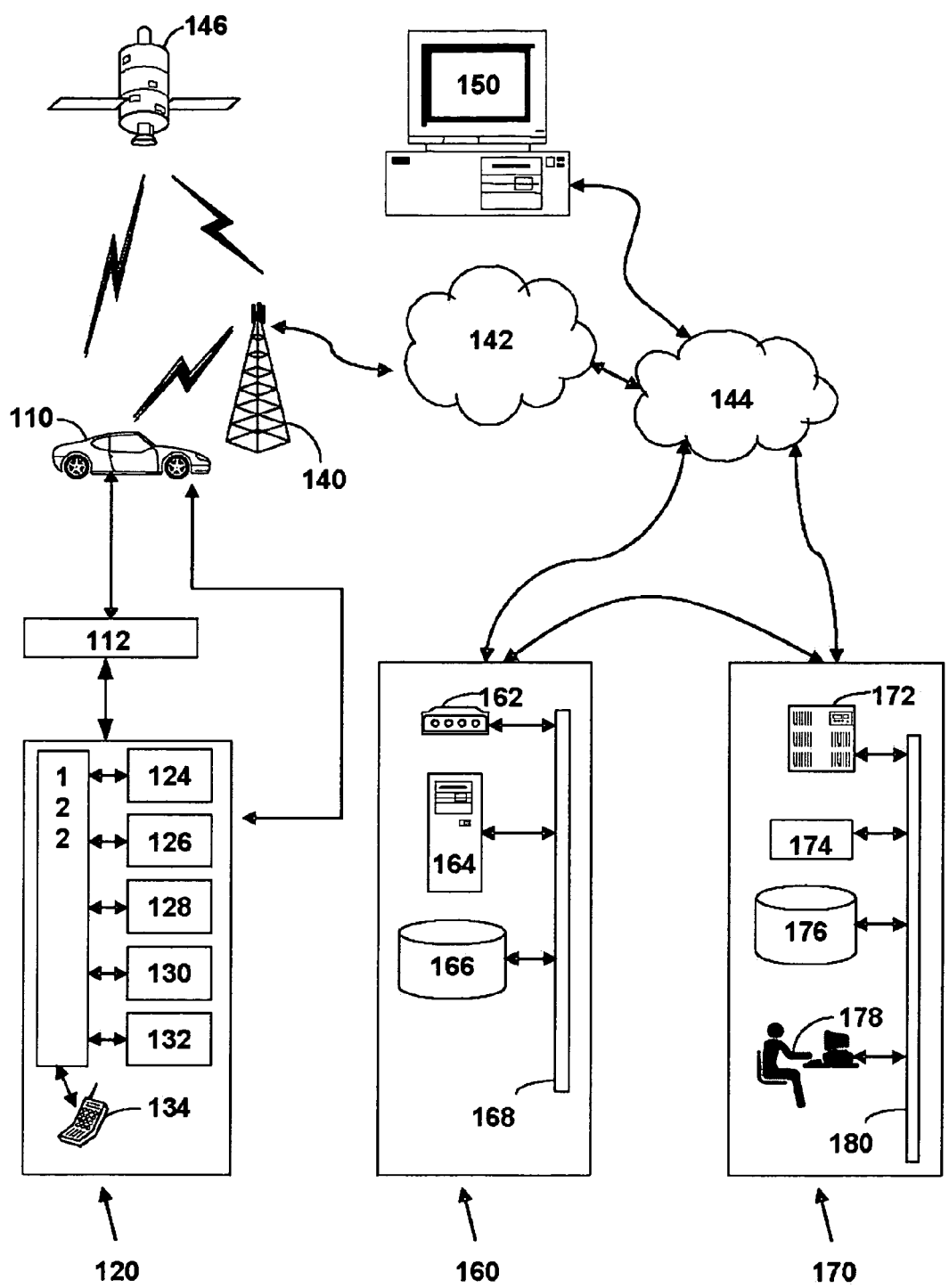
FIG. 1 illustrates a system for navigating a vehicle using a satellite-radio broadcast system, in accordance with one embodiment of the present invention.

FIG. 1 illustrates a system for navigating a vehicle, in accordance with one embodiment of the present invention and shown generally by numeral 100. Mobile vehicle communication system (MVCS) 100 includes a mobile vehicle communication unit (MVCU) 110, a vehicle communication network 112, a telematics unit 120, one or more wireless carrier systems 140, one or more communication networks 142, one or more land networks 144, one or more satellite broadcast systems 146, one or more client, personal or user computers 150, one or more web-hosting portals 160, and one or more call centers 170. In one embodiment, MVCU 110 is implemented as a mobile vehicle equipped with suitable hardware and software for transmitting and receiving voice and data communications. MVCS 100 may include additional components not relevant to the present discussion. Mobile vehicle communication systems and telematics units are known in the art.

MVCU 110 is also referred to as a mobile vehicle in the discussion below. In operation, MVCU 110 is implemented as a motor vehicle, a marine vehicle, or as an aircraft, in various embodiments. MVCU 110 may include additional components not relevant to the present discussion.

Vehicle communication network 112 sends signals to various units of equipment and systems within vehicle 110 to perform various functions such as monitoring the operational state of vehicle systems, collecting and storing data from the vehicle systems, providing instructions, data and programs to various vehicle systems, and calling from telematics unit 120. In facilitating interactions among the various communication and electronic modules, vehicle communication network 112 utilizes interfaces such as controller-area network (CAN), Media Oriented System Transport (MOST), Local Interconnect Network (LIN), Ethernet (10 base T, 100 base T), International Organization for Standardization (ISO) Standard 9141, ISO Standard 11898 for high-speed applications, ISO Standard 11519 for lower speed applications, and Society of Automotive Engineers (SAE) standard J1850 for higher and lower speed applications. In one embodiment, vehicle communication network 112 is a direct connection between connected devices.

Telematics unit 120 sends to and receives radio transmissions from wireless carrier system 140. Wireless carrier system 140 is implemented as any suitable system for transmitting a signal from MVCU 110 to communication network 142.

Telematics unit 120 includes a processor 122 connected to a wireless modem 124, a global positioning system (GPS) unit 126, an in-vehicle memory 128, a microphone 130, one or more speakers 132, and an embedded or in-vehicle mobile phone 134. In other embodiments, telematics unit 120 is implemented without one or more of the above listed components such as, for example, speakers 132. Telematics unit 120 may include additional components not relevant to the present discussion.

In one embodiment, processor 122 is implemented as a microcontroller, controller, host processor, or vehicle communications processor. In an example, processor 122 is implemented as an application specific integrated circuit (ASIC). In another embodiment, processor 122 is implemented as a processor working in conjunction with a central processing unit (CPU) performing the function of a general purpose processor. GPS unit 126 provides latitudinal and longitudinal coordinates of the vehicle responsive to a GPS broadcast signal received from one or more GPS satellite broadcast systems (not shown). In-vehicle mobile phone 134 is a cellular-type phone such as, for example a digital, dual-mode (e.g., analog and digital), dual-band, multi-mode or multi-band cellular phone. In one embodiment, processor 122 determines route corrections based on transmitted digital map information from the call center 170.

Processor 122 executes various computer programs that control programming and operational modes of electronic and mechanical systems within MVCU 110. Processor 122 controls communications (e.g., call signals) between telematics unit 120, wireless carrier system 140, and call center 170. Additionally, processor 122 controls reception of communications from satellite broadcast system 146. In one embodiment, a voice-recognition application is installed in processor 122 that can translate human voice input through microphone 130 to digital signals. Processor 122 generates and accepts digital signals transmitted between telematics unit 120 and a vehicle communication network 112 that is connected to various electronic modules in the vehicle. In one embodiment, these digital signals activate the programming mode and operation modes, as well as provide for data transfers such as, for example, data over voice channel communication. In this embodiment, signals from processor 122 are translated into voice messages and sent out through speaker 132.

Wireless carrier system 140 is a wireless communications carrier or a mobile telephone system and transmits to and receives signals from one or more MVCU 110. Wireless carrier system 140 incorporates any type of telecommunications in which electromagnetic waves carry signal over part of or the entire communication path. In one embodiment, wireless carrier system 140 is implemented as any type of broadcast communication in addition to satellite broadcast system 146. In another embodiment, wireless carrier system 140 provides broadcast communication to satellite broadcast system 146 for download to MVCU 110. In an example, wireless carrier system 140 connects communication network 142 to land network 144 directly. In another example, wireless carrier system 140 connects communication network 142 to land network 144 indirectly via satellite broadcast system 146.

Satellite broadcast system 146 transmits radio signals to telematics unit 120 within MVCU 110. In one embodiment, satellite broadcast system 146 may broadcast over a spectrum in the "S" band (2.3 GHz) that has been allocated by the U.S. Federal Communications Commission (FCC) for nationwide broadcasting of satellite-based Digital Audio Radio Service (DARS).

In operation, broadcast services provided by satellite broadcast system 146 are received by telematics unit 120 located within MVCU 110. In one embodiment, broadcast services include various formatted programs based on a package subscription obtained by the user and managed by telematics unit 120. In another embodiment, broadcast services include various formatted data packets based on a package subscription obtained by the user and managed by call center 170. Data packets include route data and digital map information. In an example, digital map information data packets received by the telematics unit 120 from the call center 170 are implemented by processor 122 to determine a route correction.

Communication network 142 includes services from one or more mobile telephone switching offices and wireless networks. Communication network 142 connects wireless carrier system 140 to land network 144. Communication network 142 is implemented as any suitable system or collection of systems for connecting wireless carrier system 140 to MVCU 110 and land network 144.

Land network 144 connects communication network 142 to client computer 150, web-hosting portal 160, and call center 170. In one embodiment, land network 144 is a public-switched telephone network (PSTN). In another embodiment, land network 144 is implemented as an Internet protocol (IP) network. In other embodiments, land network 144 is implemented as a wired network, an optical network, a fiber network, other wireless networks, or any combination thereof. Land network 144 is connected to one or more landline telephones. Communication network 142 and land network 144 connect wireless carrier system 140 to web-hosting portal 160 and call center 170.

Client, personal, or user computer 150 includes a computer usable medium to execute Internet browser and Internet-access computer programs for sending and receiving data over land network 144 and, optionally, wired or wireless communication networks 142 to web-hosting portal 160. Computer 150 sends user preferences to web-hosting portal 160 through a web-page interface using communication standards such as hypertext transport protocol (HTTP), and transport-control protocol and Internet protocol (TCP/IP). In one embodiment, the data includes directives to change certain programming and operational modes of electronic and mechanical systems within MVCU 110. In another or the same embodiment, rules for determining probable off-route conditions are configurable through the web-hosting portal 160.

In operation, a client utilizes computer 150 to initiate setting or re-setting of user preferences for MVCU 110 and/or probable off-route condition determinations. In an example, a client utilizes computer 150 to provide radio station presets as user preferences for MVCU 110. User-preference data from client-side software is transmitted to server-side software of web-hosting portal 160. In an example, user-preference data is stored at web-hosting portal 160. In another example, a client utilizes computer 150 to configure rules used by call center 170 for determining probable off-route condition(s).

Web-hosting portal 160 includes one or more data modems 162, one or more web servers 164, one or more databases 166, and a network system 168. Web-hosting portal 160 is connected directly by wire to call center 170, or connected by phone lines to land network 144, which is connected to call center 170. In an example, web-hosting portal 160 is connected to call center 170 utilizing an IP network. In this example, both components, web-hosting portal 160 and call center 170, are connected to land network 144 utilizing the IP network. In another example, web-hosting portal 160 is connected to land network 144 by one or more data modems 162. Land network 144 transmits digital data to and from modem 162, data that is then transferred to web server 164. In one embodiment, modem 162 resides inside web server 164. Land network 144 transmits data communications between web-hosting portal 160 and call center 170.

Web server 164 receives user-preference data from computer 150 via land network 144. In alternative embodiments, computer 150 includes a wireless modem to send data to web-hosting portal 160 through a wireless communication network 142 and a land network 144. Data is received by land network 144 and sent to one or more web servers 164. In one embodiment, web server 164 is implemented as any suitable hardware and software capable of providing web services to help change and transmit personal preference settings from a client at computer 150 to telematics unit 120 in MVCU 110. Web server 164 sends to or receives from one or more databases 166 data transmissions via network system 168. Web server 164 includes computer applications and files for managing and storing personalization settings supplied by the client, such as door lock/unlock behavior, radio station preset selections, climate controls, custom button configurations, and theft alarm settings. For each client, the web server potentially stores hundreds of preferences for wireless vehicle communication, networking, maintenance, and diagnostic services for a mobile vehicle. In another embodiment, web server 164 further includes data for managing turn-by-turn navigational instructions.

In one embodiment, one or more web servers 164 are networked via network system 168 to distribute user-preference data among its network components such as database 166. In an example, database 166 is a part of or a separate computer from web server 164. Web server 164 sends data transmissions with user preferences to call center 170 through land network 144.

Call center 170 is a location where many calls are received and serviced at the same time, or where many calls are sent at the same time. In one embodiment, the call center is a telematics call center, facilitating communications to and from telematics unit 120 in MVCU 110. In another embodiment, the call center is a voice call center, providing verbal communications between an advisor in the call center and a subscriber in a mobile vehicle. In yet another embodiment, the call center contains each of these functions. In other embodiments, call center 170 and web-hosting portal 160 are located in the same or different facilities.

Call center 170 contains one or more voice and data switches 172, one or more communication services managers 174, one or more communication services databases 176, one or more communication services advisors 178, and one or more network systems 180.

Switch 172 of call center 170 connects to land network 144. Switch 172 transmits voice or data transmissions from call center 170, and receives voice or data transmissions from telematics unit 120 in MVCU 110 through wireless carrier system 140, communication network 142, and land network 144. Switch 172 receives data transmissions from and sends data transmissions to one or more web-hosting portals 160. Switch 172 receives data transmissions from or sends data transmissions to one or more communication services managers 174 via one or more network systems 180.

Communication services manager 174 is any suitable hardware and software capable of providing requested communication services to telematics unit 120 in MVCU 110. Communication services manager 174 sends to or receives from one or more communication services databases 176 data transmissions via network system 180. In one embodiment, communication services manager 174 includes at least one digital and/or analog modem.

Communication services manager 174 sends to or receives from one or more communication services advisors 178 data transmissions via network system 180. Communication services database 176 sends to or receives from communication services advisor 178 data transmissions via network system 180. Communication services advisor 178 receives from or sends to switch 172 voice or data transmissions. Communication services manager 174 provides one or more of a variety of services including initiating data over voice channel wireless communication, enrollment services, navigation assistance, directory assistance, roadside assistance, business or residential assistance, information services assistance, emergency assistance, and communications assistance.

Communication services manager 174 receives service-preference requests for a variety of services from the client via computer 150, web-hosting portal 160, and land network 144. Communication services manager 174 transmits user-preference and other data such as, for example, primary diagnostic script to telematics unit 120 in MVCU 110 through wireless carrier system 140, communication network 142, land network 144, voice and data switch 172, and network system 180. Communication services manager 174 stores or retrieves data and information from communication services database 176. Communication services manager 174 may provide requested information to communication services advisor 178. In one embodiment, communication services advisor 178 is implemented as a real advisor. In an example, a real advisor is a human being in verbal communication with a user or subscriber (e.g., a client) in MVCU 110 via telematics unit 120. In another embodiment, communication services advisor 178 is implemented as a virtual advisor. In an example, a virtual advisor is implemented as a synthesized voice interface responding to service requests from telematics unit 120 in MVCU 110.

Communication services advisor 178 provides services to telematics unit 120 in MVCU 110. Services provided by communication services advisor 178 include enrollment services, navigation assistance, real-time traffic advisories, directory assistance, roadside assistance, business or residential assistance, information services assistance, emergency assistance, automated vehicle diagnostic function, and communications assistance. Communication services advisor 178 communicate with telematics unit 120 in MVCU 110 through wireless carrier system 140, communication network 142, and land network 144 using voice transmissions, or through communication services manager 174 and switch 172 using data transmissions. Switch 172 selects between voice transmissions and data transmissions.

In operation, an incoming call is routed to telematics unit 120 within mobile vehicle 110 from call center 170. In one embodiment, the call is routed to telematics unit 120 from call center 170 via land network 144, communication network 142, and wireless carrier system 140. In another embodiment, an outbound communication is routed to telematics unit 120 from call center 170 via land network 144, communication network 142, wireless carrier system 140, and satellite broadcast system 146. In this embodiment, an inbound communication is routed to call center 170 from telematics unit 120 via wireless carrier system 140, communication network 142, and land network 144.

FIG. 2 illustrates a flowchart of a method 200 representative of one embodiment of a method of navigating a vehicle. Method 200 begins at 210. The present invention may take the form of a computer usable medium including a program for determining traffic information for a mobile vehicle in accordance with the present invention. The program, stored in the computer usable medium, includes computer program code for executing the method steps described and illustrated in FIG. 2. The program and/or portions thereof are, in various embodiments, stored and executed by the MVCU 110, web-hosting portal 160, call center 170, and associated (sub-) components as needed to navigate the vehicle. In the present description and figures, an intersection includes a variety of route maneuver locations and is not limited to the intersection of two or more roads. The route maneuver locations include portions along a determined route where it is possible to navigate the vehicle off the route, such as at intersecting roads, paths, turn-offs, and the like.

At step 220, a route is determined. In one embodiment, the route is determined at the call center 170 based on a navigation assistance request made by the user. For example, the user may initiate a voice or data navigation assistance request to the communication services manager 174 in order to determine the route. The request may include a route startpoint and a route endpoint. The startpoint may alternatively be based on coordinates provided by the GPS unit 126. Once the request is made, the route is determined based on the startpoint and endpoint. The route typically includes turn-by-turn directions for navigating the vehicle from the startpoint origin to the endpoint destination.

Strategies for determining routes from provided startpoints and endpoints are known to those skilled in the art. The route may vary depending on such factors as reduction of posted speed limits, traffic incidents, accidents, weather conditions, lane and road closures, construction, planned or unplanned events impeding the flow of traffic, and the like. For example, an optimal route may be determined so as to avoid road construction. The optimal route may be determined by examining numerous potential routes with a strategy known in the art. For example, numerous roads may be examined with a geographic information system (GIS), which includes built-in precision tools for allowing real-time analysis of traffic flow and vehicle speeds. The GIS can determine the traffic volume of certain roads as well as the average speed of traffic flow on those roads thereby providing determination of an optimal route.

In another embodiment, the route is determined at a location other than the call center 170. In one embodiment, the route is determined at the vehicle by the processor 122. After its determination, the route is, in one embodiment, transmitted from the MVCU 110 to the call center 170. In yet another embodiment, the route is determined at another location and, optionally, transmitted to the call center 170 thereafter. Those skilled in the art will recognize that the route may be determined at a number of location(s) in accordance with the present invention.

At step 230, at least one probable off-route condition is determined based on the route. The probable off-route conditions include locations along the determined route where one or more off-route conditions are likely to occur. In one embodiment, rules are applied for determining probable off-route condition(s). As used herein, a "rule" is a predetermined course of action to be executed in response to a set of conditions. The rules may be applied during or after the determination of the route, step 220. The rules include, for example, a point-of-interest rule, a waypoint rule, an intersection number rule, an intersection density rule, a distance between intersections rule, an off-route condition history rule, and a road classification rule. When a given rule is satisfied, this indicates location(s) where an off-road condition is/are likely to occur.

FIGS. 3A and 3B illustrate one embodiment of a point-of-interest (POI) rule, in accordance with one aspect of the present invention. The POI rule is provided as the vehicle user may be more likely to depart from the determined route 300*a* when a POI is present nearby an intersection 320*a*. The likelihood that the vehicle user would depart from the route 300*a* is approximately inversely proportional to the distance of the POI from the route 300*a*. In one embodiment, as illustrated in FIG. 3A, the POI rule is satisfied when the POI 310*a* is equal to or less than a predetermined distance $D_1$ from the determined route 300*a*. As illustrated in FIG. 3B, the POI rule is not satisfied when the POI 310*a* is greater than the distance $D_1$ from the determined route 300*a*. POIs include various locations such as rest areas, gas stations, service plazas, restaurants, attractions, museums, monuments, shopping locations, and the like.

In one embodiment, a heuristic process is employed to determine likelihoods associated with a probabilistic determination at any point of the processes described herein.

The waypoint rule is provided as the vehicle user may be more likely to depart from the determined route at waypoint(s) along the route. In one embodiment, waypoint(s) are selected when the route is determined. In another or the same embodiment, the vehicle user provides waypoint(s) as part of the navigation assistance request. Those skilled in the art will recognize that numerous strategies may be adapted with the present invention for determining waypoints.

FIGS. 4A and 4B illustrate the intersection number rule, in accordance with one embodiment of the present invention. The intersection number rule is provided as the vehicle user may be more likely to (un)intentionally depart from the determined route 300b when a large number of route maneuvers are possible at an intersection 320b. The likelihood that the vehicle user would depart from the route 300b is approximately proportional to the number of route maneuvers available at the intersection 320b. In one embodiment, as illustrated in FIG. 4A, the intersection number rule is satisfied when the number of route maneuvers is greater than or equal to a predetermined number (e.g., in this case, 3) along the determined route 300b. As illustrated in FIG. 4B, the intersection number rule is not satisfied when the number of route maneuvers is less than the predetermined number.

Figure 5A:
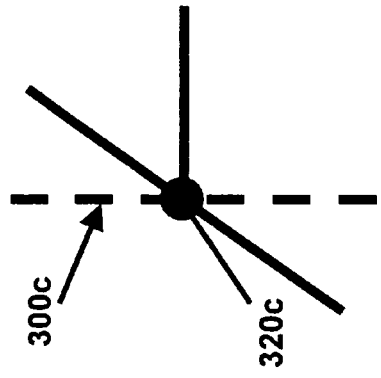
FIGS. 5A and 5B illustrate an intersection density rule, in accordance with one embodiment of the present invention.
Figure 5B:
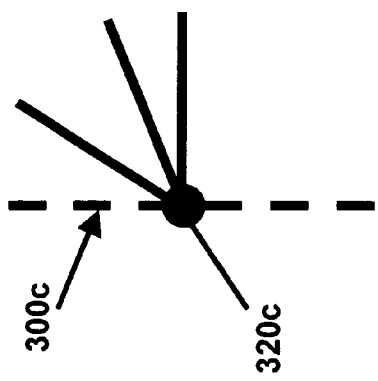

FIGS. 5A and 5B illustrate the intersection density rule, in accordance with one embodiment of the present invention. The intersection density rule is provided as the vehicle user may be more likely to (un)intentionally depart from the determined route 300c when a large density of route maneuvers is present at an intersection 320c. The likelihood that the vehicle user would depart from the route 300c is typically proportional to the density of the intersection 320c. In one embodiment, as illustrated in FIG. 5A, the intersection density rule is satisfied when the density of route maneuvers is greater than or equal to a predetermined number (e.g., in this case, 4 per 90 degrees) along the determined route 300c. As illustrated in FIG. 5B, the intersection density rule is not satisfied when the density of route maneuvers is less than the predetermined number.

Figure 6A:
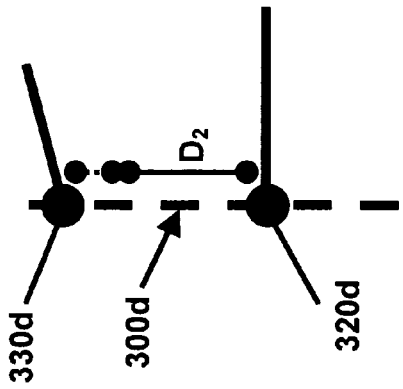
FIGS. 6A and 6B illustrate a distance between intersections rule, in accordance with one embodiment of the present invention.
Figure 6B:
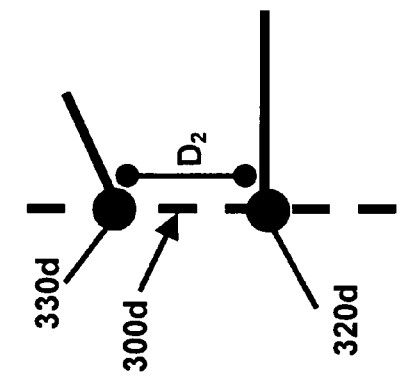

FIGS. 6A and 6B illustrate the distance between intersections rule. The distance between intersections rule is provided as the vehicle user may be more likely to (un) intentionally depart from the determined route 300d when the distance between intersections 320d, 330d is small. The likelihood that the vehicle user would depart from the route 300d is typically inversely proportional to the distance between intersections 320d, 330d. In one embodiment, as illustrated in FIG. 6A, the distance between intersections rule is satisfied when the distance between intersections 320d, 330d is less than or equal to a predetermined distance $D_2$. As illustrated in FIG. 6B, the distance between intersections rule is not satisfied when the distance between intersections 320, 330 is greater than the distance $D_2$.

Figure 7:
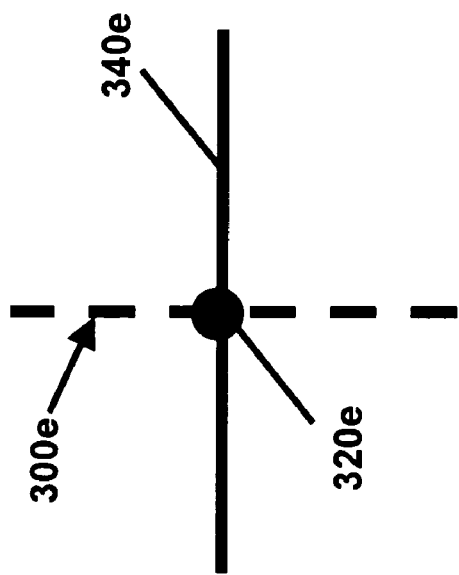
FIG. 7 illustrates a road classification rule, in accordance with one embodiment of the present invention.

FIG. 7 illustrates the road classification rule. The road classification rule is provided as the vehicle user may encounter various road classes and road conditions while on the determined route 300e. The likelihood that the vehicle user would depart from the route 300e along an alternate route 340e is substantially proportional to the degree of the similarity of road class between the routes 300e, 340e. Roads that are in the same class share similar speed categories or speed limits (i.e., average speed limit, highest speed limit, etc.). The road classification rule also includes encountering unfavorable road conditions along the route 300e, which may reduce the average speed/volume of traffic flowing therethrough. As such, the likelihood that the vehicle user would depart from the route 300e along the alternate route 340e is typically proportional to the degree of the unfavorable road condition encountered along the determined route 300e. Unfavorable road conditions include reduction of posted speed limits, traffic incidents, accidents, unfavorable weather conditions, lane and road closures, construction, planned or unplanned events impeding the flow of traffic, and the like. Unfavorable road conditions may be determined by, for example, by examining portions of the route 300e with GIS and/or by other means.

In one embodiment, the road classification rule is satisfied when the routes 300e, 340e share similar road classes or if unfavorable road condition(s) are determined on the determined route 300e. For example, if the speed limits along the routes 300e, 340e are both 55 M.P.H., then the rule is satisfied as the vehicle user may be more likely to maneuver onto the alternate route 340e. In another example, if one or more unfavorable road conditions are determined along the route 300e, thereby drastically reducing the average speed/volume of traffic flowing therethrough, then the rule is satisfied as the vehicle user may be more likely to choose the alternate route 340e to avoid traffic. The road classification rule is not satisfied when portions of the determined route 300e do not share similar road classes or if unfavorable road condition(s) are not determined on the route 300e. For example, if the speed limit along the route 300e is 55 M.P.H. and the alternate route 340e is 25 M.P.H., then the rule is not satisfied as the vehicle user may be less likely to maneuver onto the alternate route 340e. In another example, if one or more unfavorable road conditions are not determined along the route 300e, then the rule is not satisfied as the vehicle user may be less likely to choose the alternate route 340e. Those skilled in the art will recognize that the road classes and unfavorable road conditions may vary and may be defined and configured by the user, the call center 170, or other entity.

Figure 8:
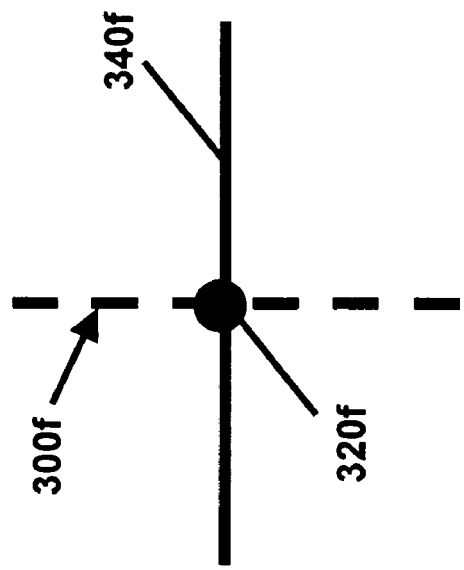
FIG. 8 illustrates an off-route condition history rule, in accordance with one embodiment of the present invention.

FIG. 8. illustrates the off-route condition history rule. The off-route condition history rule is provided as the vehicle user may be more likely to depart from the determined route 300f when the same or other vehicles have previously followed an alternate route 340f other than the route 300f at a given intersection 320f. The likelihood that the vehicle user would depart from the route 300f at the intersection 320f is typically proportional to the number of previous route maneuvers and/or previous off-route conditions at that intersection 320f. In one embodiment, the off-route condition history rule is satisfied when the number of previous route maneuvers and/or off-route conditions at the intersections 320f is greater than or equal to a predetermined number along the determined route 300f. The off-route condition history rule is not satisfied when the number of previous route maneuvers and/or off-route conditions is less than the predetermined number.

In one embodiment, one or more of the rules may be configured. Rule configuration includes, but is not limited to, weighting at least one rule, ordering at least one rule, including at least one rule, and excluding at least one rule. Rule weighting may include, for example, providing a weight factor for the rules wherein certain rules are preferentially used for determining a probable off-road condition. Rule ordering may be, for example, providing an ordinal for the rules wherein certain rules are used in order for determining a probable off-road condition. Rule inclusion may be, for example, adding one or more rules to a database of rules. Rule exclusion may be, for example, removing one or more rules to the database of rules. The rules may be configured by means of application configuration and user level configuration. For example, rules may be configured for an individual user or for all users matching certain criteria. In one example, a rule for all 2006 model year Cadillac vehicles is executed with a batch file. In another example, a rule for all 2007 Cadillac STS vehicles is executed with a batch file. A system administrator configures the rules, using a configuration file, in one embodiment. For example, the system administrator executes an application to process a batch file. In another example, a user executes a rule using an interface such as a web or voice portal or an advisor, such as advisor 178 described in FIG. 1.

Those skilled in the art will recognize that the rules, criteria for satisfying the rules, determination of probable off-route conditions, and rule configuring may vary and are not limited to the examples provided herein. Numerous other strategies for accomplishing these steps may be adapted in accordance with the present invention.

At step 240, an off-route condition history database is determined. In one embodiment, the off-route condition history database is unique to each system user and is based on a personal off-road condition history. When a probable off-road condition is determined for a user (i.e., by applying one or more rules), data including geographic coordinates of the vehicle (i.e., as determined by the GPS unit 126) are transmitted from the MVCU 110 to the call center 170. The data is stored (i.e., at the web-hosting portal 160 and/or the communication services manager 174) and acquired over time thereby forming the personal database. The data in the database is weighted by frequency of occurrence. Data weighting may include, for example, providing a weight factor wherein more frequently occurring historical off-road conditions locations are more likely to trigger a probable off-road condition at the same location. The personal database provides a determination of probable off-route condition(s) based on a user's tendency to experience an off-road condition at a given intersection. The determination is based on instances that include (un)intentionally taking a different route from the present determined route (i.e., by getting lost, visiting a POI, or another reason).

In another embodiment, the off-route condition history database is collective (i.e., two or more users of the same and/or different vehicles) and is based on multiple user off-road condition histories. When a probable off-road condition is determined for any user (i.e., by applying one or more rules), data including geographic coordinates of the vehicle (i.e., as determined by the GPS unit 126) are transmitted from the MVCU 110 to the call center 170. The probable off-road condition data may be transmitted immediately, or the transmission may be delayed, for example, until the next communication with the call center. The data is stored (i.e., at the web-hosting portal 160 and/or the communication services manager 174) and acquired over time thereby forming the collective database. The data in the collective database is weighted by frequency of occurrence. Data weighting may include, for example, providing a weight factor wherein more frequently occurring historical off-road conditions locations are more likely to trigger a probable off-road condition at the same location. The collective database provides a determination of a probable off-route condition without the need for a user to have previously experienced an off-road condition at a given intersection. Rather, the determination is based on other driver's experiences that include (un)intentionally taking a different route from the present determined route (i.e., by getting lost, visiting a POI, or another reason). In yet another embodiment, the user may choose between the use of the personal, collective, and/or another off-route condition history database.

At step 250, digital map information is transmitted based on the determination of the at least one probable off-route condition from the call center 170 to the MVCU 110 unit via a wireless connection. In one embodiment, if one or more rules are satisfied and a determination of a probable off-road condition is made, digital map information at and near the location (i.e., represented as a node, link, or shape point) of the probable off-road condition is transmitted. The amount of digital map information included in the transmission may vary and is defined at the call center 170 and/or another location. In addition, the amount of information may vary based on the type and location of the probable off-route condition. For example, when the POI rule is satisfied, digital map information including the location of the probable off-route condition as well as the area surrounding the POI is transmitted. As such, the digital map information is not limited to a fixed distance corridor around the determined route. The digital map information is stored in a database at the call center 170 and/or another location and includes map data along the route as well as surrounding map data where the probable off-road condition(s) was/were determined. Digital map information transmission and storage in/access to databases are known in the art.

At step 260, a route correction is determined based on the transmitted digital map information. In one embodiment, the route correction is determined by the processor 122 based on transmitted digital map information from the call center 170. As the route correction is determined locally (i.e., at the vehicle), the amount of data to be transmitted from the call center 170 to the MVCU 110 is reduced. The route correction may include turn-by-turn directions to the determined route or to the endpoint from the current position of the vehicle. Strategies for determining route correction are known in the art.

The method terminates at step 270 and is repeated as appropriate. Those skilled in the art will recognize that the step order may be varied and is not limited to the order defined herein. In addition, step(s) may be eliminated, added, or modified in accordance with the present invention.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A method of navigating a vehicle, the method comprising:
   determining a route;
   determining at least one probable off-route condition based on the route; and
   transmitting digital map information based on the determination of the at least one probable off-route condition from a call center to a vehicle telematics unit via a wireless connection.

2. The method of claim 1, wherein the route is determined at the call center.

3. The method of claim 1, wherein determining the at least one probable off-route condition comprises applying at least one rule.

4. The method of claim 3, wherein the at least one rule is selected from a group consisting of a point-of-interest rule, a waypoint rule, an intersection number rule, an intersection density rule, a distance between intersections rule, a road classification rule, and an off-route condition history rule.

5. The method of claim 4, wherein the off-route condition history is selected from a group consisting of a personal off-road condition history and a collective off-road condition history.

6. The method of claim 1 further comprising determining an off-route condition database.

7. The method of claim 1, wherein determining the at least one probable off-route condition comprises configuring at least one rule.

8. The method of claim 7, wherein configuring the at least one rule comprises at least one of weighting at least one rule, ordering at least one rule, including at least one rule, and excluding at least one rule.

9. The method of claim 7, wherein configuring the at least one rule is selected from a group consisting of an application configuration and a user level configuration.

10. The method of claim 1 further comprising determining a route correction based on the transmitted digital map information.

11. A computer usable medium including a program for navigating a vehicle, the computer usable medium comprising:
   computer readable program code for determining a route;
   computer readable program code for determining at least one probable off-route condition based on the route; and
   computer readable program code for transmitting digital map information based on the determination of the at least one probable off-route condition from a call center to a vehicle telematics unit via a wireless connection.

12. The computer usable medium of claim 11, wherein the route is determined at the call center.

13. The computer usable medium of claim 11, wherein determining the at least one probable off-route condition comprises applying at least one rule.

14. The computer usable medium of claim 13, wherein the at least one rule is selected from a group consisting of a point-of-interest rule, a waypoint rule, an intersection number rule, an intersection density rule, a distance between intersections rule, a road classification rule, and an off-route condition history rule.

15. The computer usable medium of claim 14, wherein the off-route condition history is selected from a group consisting of a personal off-road condition history and a collective off-road condition history.

16. The computer usable medium of claim 11 further comprising computer readable program code for determining an off-route condition history.

17. The computer usable medium of claim 11, wherein determining the at least one probable off-route condition comprises configuring at least one rule.

18. The computer usable medium of claim 11 further comprising computer readable program code for determining a route correction based on the transmitted digital map information.

19. A system for navigating a vehicle, the system comprising:
   means for determining a route;
   means for determining at least one probable off-route condition based on the route; and
   means for transmitting digital map information based on the determination of the at least one probable off-route condition from a call center to a vehicle telematics unit via a wireless connection.

20. The system of claim 19 further comprising means for determining an off-route condition history.

* * * * *